July 13, 1937.  R. REED  2,086,739
OIL FILTER
Filed Feb. 29, 1936

INVENTOR.
RALPH REED.
BY.
ATTORNEY.

Patented July 13, 1937

2,086,739

UNITED STATES PATENT OFFICE 2,086,739

OIL FILTER

Ralph Reed, Long Beach, Calif.

Application February 29, 1936, Serial No. 66,321

2 Claims. (Cl. 210—165)

This invention relates to an oil filter, particularly for engines, and is of the duplex type in which oil enters at one end into the filter housing and then passes thru one of two filter packs towards two outlets in the filter housing.

An object of my invention is to provide a filter which will effectively separate the sludge and heavy particles from the oil before the oil passes thru the filter packs, and with a novel means of draining or removing the sludge and heavy particles from the filter housing.

Another object is to provide a novel oil filter in which the filter packs can be easily removed and cleaned or replaced.

Still another object is to provide a novel filter which will operate for a long period of time without requiring attention in the way of cleaning or replacing.

Other objects, advantages and features of invention may appear from the accompanying drawing, the subjoined detailed description, and the appended claims.

Figure 1:
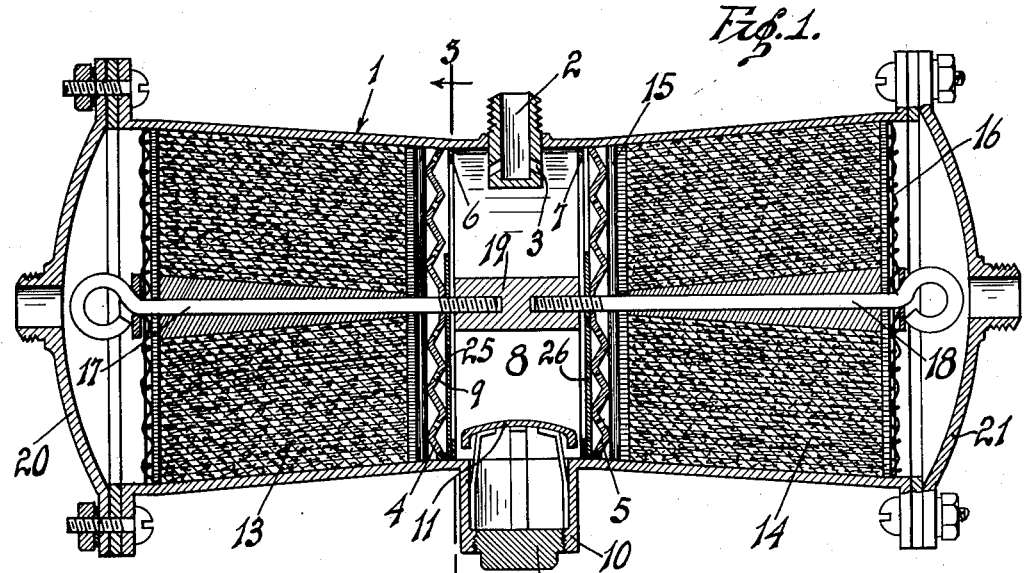
Figure 1 is a longitudinal sectional view of my filter.
Figure 2:
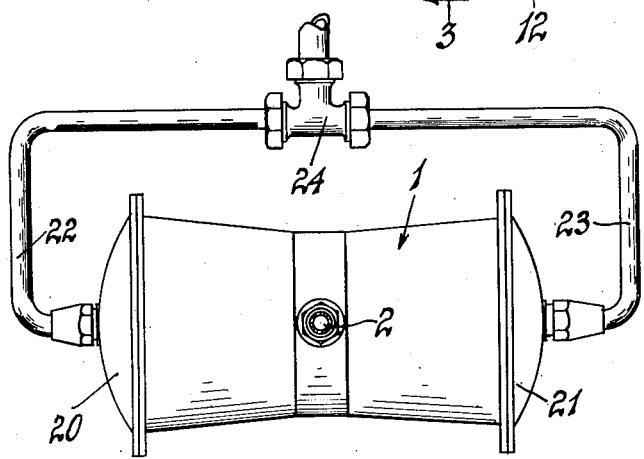
Figure 2 is a top plan view of the same.
Figure 3:
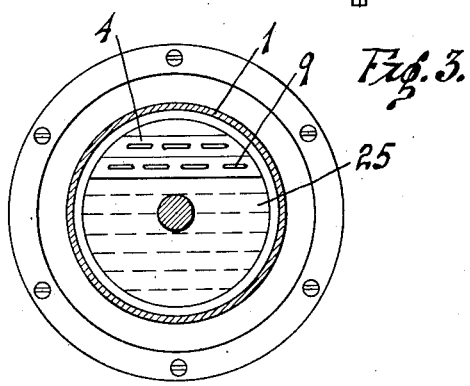
Figure 3 is a sectional view taken on line 3—3 of Fig. 1.

Referring more particularly to the drawing, the numeral 1 indicates the filter housing, substantially cylindrical in shape, altho both ends are somewhat flared to a slightly greater diameter at the outer ends. An oil intake fitting 2 extends into the housing 1, substantially in the center of said housing. The fitting 2 is provided with outwardly extending ports 3 so that the incoming oil is spread outwardly for a purpose to be further described.

On each side of the intake 2 and spaced therefrom, I provide corrugated baffle plates 4, 5 which plates extend entirely across the housing 1. Each of the plates is set against a stop lug 6, 7, respectively, to prevent its moving inwardly. Thus, a sludge chamber 8 is provided in the center of the filter. Each of the baffle plates 4, 5 is provided with a plurality of upwardly extending ports 9 thru which the oil passes into the filter packs, to be subsequently described.

It is to be noted that the holes 9 are directed upwardly, the purpose being to permit only the oil to pass into the filter packs while the heavier sludge, carbon particles, and the like, are dropped to the bottom of the chamber 8.

A drain sump 10 is provided in the body 1 at the bottom of the chamber 8. This sump is partially covered by a baffle plate 11. A drain plug 12 closes the bottom of the sump, and on removal of this plug, the sludge and heavy particles can be removed from the filter.

Filter packs 13, 14 are provided in each end of the housing 1 and these filter packs preferably comprise spirally-wound filter cloth over paper. Suitable filtering material, such as cloth, is provided at the inner ends of each of the filter packs, as shown at 15. A screen 16 is provided at the outer ends of each of the filter packs, the purpose of which is to prevent any of the filtering material from entering the outlet lines and thence passing into the engine.

The filter packs 13, 14 are held in position against the baffle plates 4, 5 by means of bolts 17, 18, respectively. These bolts screw into a spacer block 19 which block is positioned within the chamber 8. Heads 20, 21 close the outer ends of the housing 1 and the outlet lines 22, 23 extend from these heads and are brought together in a single line thru the T-fitting 24.

When the plug 12 is removed, the oil which is standing in the bottom of each of the filter packs 13, 14, will drain out. To prevent this, I provide a pair of transverse plates 25, 26 which are arcuate in shape so that the incoming oil can pass over the tops of the plates but when the filter is drained, these plates will prevent the clean oil from passing out thru the sump 10.

Having described my invention, I claim:

1. An oil filter comprising a housing, an oil intake fitting extending into the center of the housing, said housing having a sludge chamber in the center thereof, a sump in the lower end of the sludge chamber, a removable plug in the sump, a filter pack in each end of the housing, a head closing each end of the housing, an outlet pipe extending from each head, a corrugated baffle plate at the inner end of each of the filter packs, each of said plates having oil holes extending therethru, a transverse plate at the inner end of each of the filter packs, said plates extending partially to the top of the sludge chamber, a spacer block arranged between the last named plates, and a bolt extending thru each of the filter packs, both of said bolts screwing into the spacer block whereby the filter packs are held in position.

2. An oil filter comprising a housing, said housing flaring towards the outer ends thereof, a filter pack in each end of the housing, said housing having a sludge chamber in the center thereof between the filter packs, an intake fitting extending into the sludge chamber, said fitting having outwardly directed ports therein, a corrugated baffle plate at the inner end of each of the filter packs, said baffle plates having oil holes extending therethru, a drain plug in the bottom of the sludge chamber, a head closing each end of the housing, and an outlet pipe extending from each head, a plate on the inner end of each of the filter packs, said plates extending transversely of the housing and partly to the top of the sludge chamber, a spacer block arranged between the last named plates, and a bolt extending thru each of the filter packs, both of said bolts screwing into the spacer block whereby the filter packs are held in position.

RALPH REED.